(12) United States Patent
Gore

(10) Patent No.: US 7,329,630 B2
(45) Date of Patent: *Feb. 12, 2008

(54) STABILIZERS AND ANTI-FADE AGENTS FOR USE IN INFRARED SENSITIVE LEUCO DYE COMPOSITIONS

(75) Inventor: Makarand P. Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 456 days.

This patent is subject to a terminal disclaimer.

(21) Appl. No.: 10/655,684

(22) Filed: Sep. 5, 2003

(65) Prior Publication Data

US 2005/0053863 A1    Mar. 10, 2005

(51) Int. Cl.
*B41M 5/30* (2006.01)

(52) U.S. Cl. ............... 503/209; 106/31.16; 106/31.21; 106/31.22; 106/31.2; 430/270.1; 503/218; 503/220; 503/221; 503/224

(58) Field of Classification Search ............ None
See application file for complete search history.

(56) References Cited

U.S. PATENT DOCUMENTS

| | | |
|---|---|---|
| 4,341,860 A | 7/1982 | Sysak |
| 4,423,139 A | 12/1983 | Isbrandt et al. |
| 4,871,713 A | 10/1989 | Matsuoka et al. |
| 4,876,233 A | 10/1989 | Saeki et al. |
| 4,895,827 A | 1/1990 | Vervacke et al. |
| 4,929,530 A | 5/1990 | Saeki et al. |
| 5,187,049 A | 2/1993 | Sher et al. |
| 5,274,623 A | 12/1993 | Usami et al. |
| 5,286,704 A | 2/1994 | Yoshikawa et al. |
| 5,362,536 A | 11/1994 | Fleming et al. |
| 5,607,739 A | 3/1997 | Bartholomeusz |
| 5,645,964 A | 7/1997 | Nohr et al. |
| 5,952,073 A | 9/1999 | Hurditch et al. |
| 5,955,224 A | 9/1999 | Caspar et al. |
| 6,077,584 A | 6/2000 | Hurditch |
| 6,251,571 B1 | 6/2001 | Dessauer et al. |
| 6,514,677 B1 * | 2/2003 | Ramsden et al. ........... 430/350 |
| 6,632,584 B1 * | 10/2003 | Morgan .................... 430/271.1 |
| 6,958,181 B1 * | 10/2005 | Gore .......................... 428/64.1 |

FOREIGN PATENT DOCUMENTS

| | | |
|---|---|---|
| EP | 0 543 136 | 5/1993 |
| EP | 0889363 A1 | 1/1999 |
| EP | 0 941 866 | 9/1999 |
| EP | 0994381 A1 | 4/2000 |

* cited by examiner

Primary Examiner—Bruce H. Hess

(57) ABSTRACT

Compositions and methods for production of color images having increased light stability and reduced browning are described. The color forming composition can include a leuco dye, an infrared absorber, and at least one of a stabilizer and an anti-fade agent. The color forming compositions can be stabilized such that less than about a 30% decrease in optical density occurs over a three year period. The stabilizers can include chroman, thiolane-nickel complexes, spiroindanes, while suitable anti-fade agents can include vitamin E, vitamin E analogs, astaxanthin, chroman, ascorbic acid, carotene, and mixtures thereof. The color forming compositions are ambient light stable and are useful in forming images on a wide variety of substrates such as optical disks.

51 Claims, No Drawings

STABILIZERS AND ANTI-FADE AGENTS FOR USE IN INFRARED SENSITIVE LEUCO DYE COMPOSITIONS

FIELD OF THE INVENTION

The present invention relates generally to color forming compositions. More particularly, the present invention relates to components used to enhance the light stability and long term appearance of such compositions.

BACKGROUND OF THE INVENTION

Compositions which produce a color change upon exposure to light or heat are of great interest in producing images on a variety of substrates. Optical disks represent a significant percentage of the market for data storage of software as well as of photographic, video, and/or audio data. Typically, optical disks have data patterns embedded thereon that can be read from and/or written to one side of the disk, and a graphic display printed on the other side of the disk.

In order to identify the contents of the optical disk, printed patterns or graphic display information can be provided on the non-data side of the disk. The patterns or graphic display can be both decorative and provide pertinent information about the data content of the disk. In the past, commercial labeling has been routinely accomplished using screen-printing methods. While this method can provide a wide variety of label content, it tends to cost ineffective for production of less than about 400 customized disks because of the fixed costs associated with preparing a stencil or combination of stencils and printing the desired pattern or graphic display.

In recent years, the significant increase in the use of optical disks for data storage by consumers has increased the demand to provide customized labels to reflect the content of the optical disk. Most consumer available methods of labeling are limited to either handwritten descriptions which lack professional appearance, quality and variety, or peripheral labels which may be affixed to the disk, but which can also adversely affect the disk performance upon spinning at high speeds.

In accordance with the present invention, a variety of leuco dye-containing compositions have been investigated for use on optical disks and other substrates. Leuco dye compositions thus far investigated often include a leuco dye along with an optional activator and an infrared absorber. However, many of these compositions are insufficiently stable under light exposure, and are not durable enough for practical use. Over a period of a short time, exposure to sunlight or fluorescent lights can reduce activity and absorbance of the infrared absorbers, thus reducing the quality of leuco dye development. Further, the leuco dye and/or other components have a tendency to cause browning during exposure to ambient light sources and/or UV light used during curing steps. For this and other reasons, the need still exists for leuco dye compositions which have improved stability, and which have improved image forming and developing characteristics.

SUMMARY OF THE INVENTION

It has been recognized that it would be advantageous to provide rapidly developable and light stable color forming compositions. In one aspect of the present invention, a color forming composition can include a leuco dye, an infrared absorber, and at least one of a stabilizer and an anti-fade agent. The stabilizers can include chroman, thiolane-nickel complexes, spiroindanes, while suitable anti-fade agents can include vitamin E, vitamin E analogs, chroman, astaxanthin, ascorbic acid, carotene, and mixtures thereof.

Additional features and advantages of the invention will be apparent from the detailed description which follows, which illustrates, by way of example, features of the invention.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a stabilizer" includes reference to one or more of such materials.

As used herein, the term "color forming composition" typically includes a leuco dye, an infrared absorber, and at least one of a stabilizer and an anti-fade agent. These components can work together upon exposure to infrared radiation to reduce the leuco dye to produce a dye having color or a change in color. For purposes of the present invention, the term "color" or "colored" can refer to change in visible absorbance that occurs upon development, including development to black, white, or traditional colors. An undeveloped leuco dye can be colorless or may have some color which changes upon development to a different color.

As used herein, "developing," "development," or the like refers to an interaction or reaction which reduces the leuco dye to produce a visible change in color through reduction to the corresponding colored leuco dye.

As used herein, "infrared absorber" refers generally to an infrared radiation sensitive agent that can generate heat or otherwise transfer energy to surrounding molecules upon exposure to infrared radiation. Infrared radiation includes near infrared radiation in the range of from about 700 nm to about 40 μm, although about 700 nm to about 1200 nm is common for most near infrared applications. When admixed with or in thermal contact with a leuco dye and/or a corresponding activator, an infrared absorber can be present in sufficient quantity so as to produce heat sufficient to at least partially develop the leuco dye in accordance with embodiments of the present invention.

As used herein, "thermal contact" refers to the spatial relationship between an absorber and a color forming composition. For example, when an absorber is heated by interaction with infrared radiation, the heat generated by the absorber should be sufficient to cause the leuco dye of the color forming composition to darken, or change or become colored, though a chemical reaction. Thermal contact can include close proximity between an absorber and a color forming composition, which allows for heat transfer from the absorber toward the leuco dye and/or activator. Thermal contact can also include actual contact between an absorber and leuco dye, such as in immediately adjacent layers, or in an admixture including both constituents.

As used herein, "optical proximity" refers to the spatial relationship of the stabilizer with respect to the infrared absorber. Specifically, in order for the stabilizer to effectively protect the infrared absorber from significant decrease in activity, the stabilizer can be admixed with or overcoated with respect to the infrared absorber.

As used herein, "optical density" refers to the logarithm of the reciprocal of transmittance, where transmittance is the radio of transmitted power to incident power.

As used herein, the term "spin-coatable composition" includes a liquid carrier having various components dissolved or dispersed therein. In some embodiments, the spin-coatable composition can comprise a leuco dye and an infrared absorber in a common liquid carrier. In other embodiments, fewer components can be present in a liquid carrier forming the spin-coatable composition. Thus, for example, the leuco dye and an optional activator can be spin-coatable and applied to a substrate and then an infrared absorber can be formed in a separate layer which can be applied by spraying, screen-printing, or other methods which do not require spin-coatability. Color forming compositions can be spin-coatable in one embodiment, or can be configured for other application methods as well, e.g., printing such has offset, ink-jet, gravure, roller coating, screen printing or other application methods known to those skilled in the art.

As used herein, "optimization" and "optimized" refer to a process of selection of components of the color forming composition which results in a rapidly developable composition under a fixed period of exposure to infrared radiation. For example, typically, compositions of the present invention can be optimized for development using 780 nm laser light in which substantially all of the color forming composition exposed to the infrared radiation is developed in less than a predetermined period of time, e.g., 100 μsec. However, "optimized" does not necessarily indicate that the color forming composition is developed most rapidly at a specific wavelength, but rather that the composition can be developed within a specified time frame using a given infrared radiation source. An optimized composition would also indicate an ambient light stability over extended periods of time, i.e. several months to years.

As used herein, "optical disk" is meant to encompass audio, video, multi-media, and/or software disks that are machine readable in a CD and/or DVD drive, or the like. Examples of optical disk formats include writeable, recordable, and rewriteable disks such as DVD, DVD-R, DVD-RW, DVD+R, DVD+RW, DVD-RAM, CD, CD-ROM, CD-R, CD-RW, and the like. Other like formats may also be included, such as similar formats and formats to be developed in the future.

As used herein, "graphic display" can include any visible character or image found on an optical disk. Typically, the graphic display is found prominently on one side of the optical disk, though this is not always the case.

As used herein, "data" is typically used with respect to the present disclosure to include the non-graphic information contained on the optical disk that is digitally or otherwise embedded therein. Data can include audio information, video information, photographic information, software information, and the like.

It is important to note that, with respect to leuco dyes, infrared absorbers, stabilizers, anti-fade agents, activators, reducing agents, and other non-liquid carrier components, the weight percent values are measured relative to a dry basis, thus excluding the liquid carrier. In other words, unless otherwise specified, values of "wt %," "% by weight," or "weight percent" refer to the compositions that will be present in the color forming composition excluding any carrier, such as after drying or curing, as in case of UV (ultraviolet) or EB (electron beam) curable formulations, on a substrate.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 μm to about 200 μm should be interpreted to include not only the explicitly recited limits of 1 μm to about 200 μm, but also to include individual sizes such as 2 μm, 3 μm, 4 μm, and sub-ranges such as 10 μm to 50 μm, 20 μm to 100 μm, etc.

In accordance with the present invention, a color forming composition can include a leuco dye, an infrared absorber admixed with or in thermal contact with the leuco dye. The color forming compositions of the present invention can further include at least one of a stabilizer and an anti-fade agent, each component having beneficial effects on the long-term stability and color forming characteristics of the composition. Specifically, the stabilizer can be configured for stabilizing the infrared absorber and the anti-fade agent can be configured for inhibiting oxidation, or browning due to other processes, of the leuco dye. Accordingly, the present invention provides improved color forming compositions on optical disk substrates, including various specific stabilizers and anti-fade agents suitable for use with certain infrared absorbers and leuco dyes.

Upon application of infrared energy, the infrared absorber and leuco dye are heated sufficiently to cause chemical change of the leuco dye to form the colored form of the leuco dye. Specific leuco dyes, infrared absorbers, stabilizers, and anti-fade agents each affect the long-term stability and development properties of the color forming composition and are discussed in more detail below.

Leuco Dyes

The color forming composition of the present invention can include a wide variety of leuco dyes. Suitable leuco dyes include, but are not limited to, fluorans, phthalides, aminotriarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids (cyanoethanes, leuco methines) and corresponding esters, 2(p-hydroxyphenyl)-4,5-diphenylimidazoles, indanones, leuco indamines, hydrozines, leuco indigoid dyes, amino-2,3-dihydroanthraquinones, tetrahalo-p,p'-biphenols, 2(p-hydroxyphenyl)-4,5-diphenylimidazoles, phenethylanilines, phthalocyanine precursors (such as those available from Sitaram Chemicals, India), and other known leuco dye compositions. Experimental testing has shown that fluoran based dyes are one class of leuco dyes which exhibit particularly desirable properties.

In one aspect of the present invention, the leuco dye can be a fluoran, phthalide, aminotriarylmethane, or mixture thereof. Several non-limiting examples of suitable fluoran based leuco dyes include 3-diethylamino-6-methyl-7-anilinofluorane, 3-(N-ethyl-p-toluidino)-6-methyl-7-anilinofluorane, 3-(N-ethyl-N-isoamylamino)-6-methyl-7-methyl-7-anilinofluorane, 3-diethylamino-6-methyl-7-(o,p-dimethylanilino)fluorane, 3-pyrrolidino-6-methyl-7-anilinofluorane, 3-piperidino-6-methyl-7-anilinofluorane, 3-(N-cyclohexyl-N-methylamino)-6-methyl-7-anilinofluorane, 3-diethylamino-7-(m-trifluoromethylanilino)fluorane, 3-dibutylamino-6-methyl-7-anilinofluorane, 3-diethylamino-6-chloro-7-anilinofluorane, 3-dibutylamino-7-(o-chloroanilino)fluorane, 3-diethylamino-7-(o-chloroanilino) fluorane, 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1(3H)-isobenzofuranone,4,5,6,7-tetrachloro-3,3-bis[2-[4-(dimethylamino)phenyl]-2-(4-methoxyphenyl)ethenyl], 2-anilino-3-methyl-6-(N-ethyl-N-isoamylamino)fluorane (S-205 available from Nagase Co., Ltd), and mixtures thereof. Suitable aminotriarylmethane leuco dyes can also be used in the present invention such as tris(N,N-dimethylaminophenyl) methane (LCV); tris(N,N-diethylaminophenyl) methane(LECV); tris(N,N-di-n-propylaminophenyl) methane (LPCV); tris(N,N-di-n-butylaminophenyl) methane (LBCV); bis(4-diethylaminophenyl)-(4-diethylamino-2-methyl-phenyl) methane (LV-1); bis(4-diethylamino-2-methylphenyl)-(4-diethylamino-phenyl) methane (LV-2); tris(4-diethylamino-2-methylphenyl) methane (LV-3); bis(4-diethylamino-2-methylphenyl)(3,4-dimethoxyphenyl) methane (LB-8); aminotriarylmethane leuco dyes having different alkyl substituents bonded to the amino moieties wherein each alkyl group is independently selected from C1-C4 alkyl; and aminotriaryl methane leuco dyes with any of the preceding named structures that are further substituted with one or more alkyl groups on the aryl rings wherein the latter alkyl groups are independently selected from C1-C3 alkyl. Other leuco dyes can also be used in connection with the present invention and are known to those skilled in the art. A more detailed discussion of some of these types of leuco dyes may be found in U.S. Pat. Nos. 3,658,543 and 6,251,571, each of which are hereby incorporated by reference in their entireties. Additional examples and methods of forming such compounds can be found in *Chemistry and Applications of Leuco Dyes*, Muthyala Ramaiha, ed., Plenum Press, New York, London; ISBN: 0-306-45459-9, which is hereby incorporated by reference.

Typically, the leuco dyes can be present in color forming compositions of the present invention at from about 1 wt % to about 40 wt %. Although amounts outside this range can be successfully used, depending on the other components of the composition, amounts of from about 5 wt % to about 20 wt % frequently provide adequate results.

Infrared Radiation Absorber

An infrared radiation absorber can be included in the color forming composition as a component which can be used to optimize development of the color forming composition at a predetermined speed and/or wavelength. The infrared absorber can be applied as a separate layer which can be optionally spin-coatable or screen-printable, or can be applied in a common liquid carrier with the leuco dye. The infrared absorber can act as an energy antenna, providing heat to surrounding areas upon interaction with an energy source. As a predetermined amount of heat can be provided by the infrared absorber, matching of the infrared wavelength and intensity to the particular absorber used can be carried out to optimize the system.

Various absorbers will act as an antenna to absorb electromagnetic radiation of specific wavelengths and ranges. Of particular interest is laser light having infrared wavelengths from about 600 nm to about 1200 nm. Therefore, the present invention can provide color forming compositions optimized for use in devices that emit wavelengths within this range. Typical commercial IR lasers found in common CD and DVD equipment provide energy at a wavelength of about 650 nm, 780 nm, and 900 nm, while other commercial imaging lasers such as GaAs lasers can operate at about 830 nm. Thus, the compositions of the present invention using appropriate infrared radiation absorbers can be used in equipment that is already commonly available on the market. In one embodiment, infrared wavelengths in the near infrared range having wavelengths from about 760 nm to about 1200 nm can be used in accordance with the present invention, and in one aspect, can be from about 760 nm to about 850 nm. In another more specific aspect, infrared radiation having a wavelength of from about 760 nm to about 800 nm can be used.

The absorber can be configured to be in a heat-conductive relationship with the leuco dyes of the present invention. For example, the infrared absorber can be placed in the same layer as the leuco dye as part of an admixture, or can be in a separate layer. Thus, the infrared absorber can be admixed with or in thermal contact with the leuco dye. In one aspect of the present invention, the infrared absorber can be applied to the substrate in a separate adjacent layer prior to or after applying the leuco dyes as a layer to form a color forming composition on the substrate. In one embodiment, consideration can also be given to choosing the infrared absorber such that any light absorbed in the visible range does not adversely affect the graphic display or appearance of the color forming composition either before or after development.

Although an inorganic compound can be used, e.g., ferric oxide, carbon black, selenium, and the like, the infrared absorber typically can be an organic compound, such as, but not limited to polymethine dyes such as pyrimidinetrione-cyclopentylidenes, guaiazulenyl dyes, croconium dyes, polymethine indolium dyes, metal complex IR dyes, cyanine, dyes indocyanine green, squarylium dyes, chalcogenopyryloarylidene dyes, metal thiolate complex dyes, bis(chalcogenopyrylo)polymethine dyes, oxyindolizine dyes, bis(aminoaryl)polymethine dyes, merocyanine dyes, indolizine dyes, pyrylium dyes, quinoid dyes, quinone dyes, phthalocyanine dyes, naphthalocyanine dyes, azo dyes, hexafunctional polyester oligomers, heterocyclic compounds, and combinations thereof.

In one aspect of the present invention, the infrared absorber can be polymethine dye or derivative thereof such as pyrimidinetrione-cyclopentylidene, squarylium dyes such as guaiazulenyl dyes, croconium dyes, or mixtures thereof. Suitable pyrimidinetrione-cyclopentylidene infrared absorbers include, for example 2,4,6(1H,3H,5H)-pyrimidinetrione 5-[2,5-bis[(1,3-dihydro-1,1,3-dimethyl-2H-indol-2-ylidene) ethylidene]cyclopentylidene]-1,3-dimethyl-(9CI) (SO322 available from Few Chemicals, Germany) shown in Formula I as follows:

Formula I

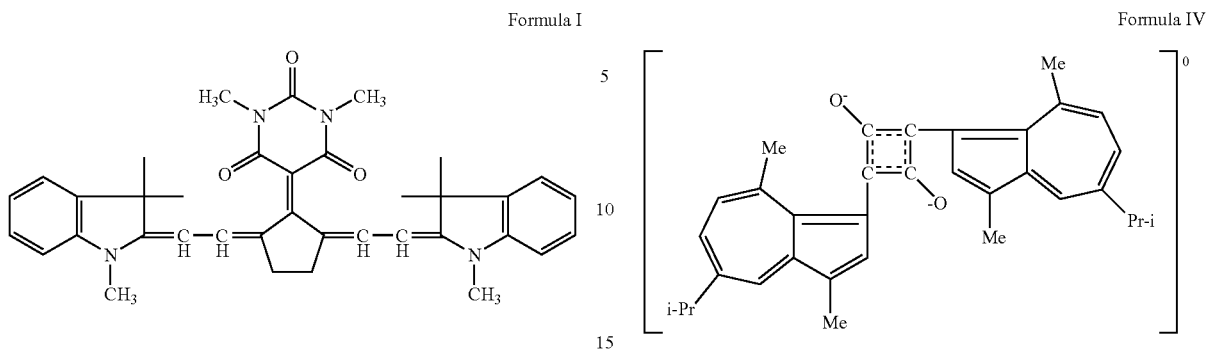

2,4,6(1H,3H,5H)-pyrimidinetrione 5-[2,5-bis[(1,3-dihydro-1,1,3-trimethyl-2H-benz[e]indol-2-ylidene) ethylidene]cyclopentylidene]-1,3-dimethyl-(9CI) (Chemical Abstracts Services's 9th Collective Index) having the chemical structure shown in Formula II as follows:

Formula II

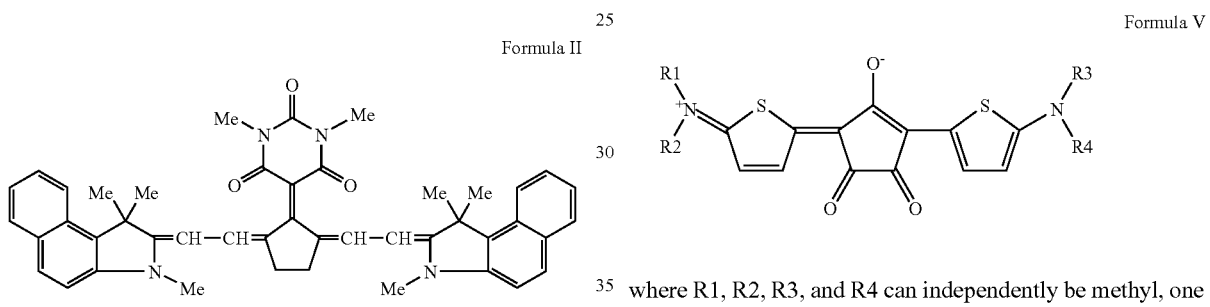

or pyrimidinetrione-cyclopentylidenes having the chemical sub-structure shown in Formula III as follows:

Formula III

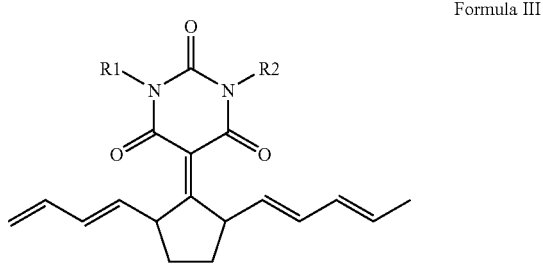

where R1 and R2 can be aryl or alkyl chains with terminal hydroxyl or carboxyl substituents, aryl or substituted aryl such as naphthyl, indolenyl and quilonyl groups.

Suitable squarylium dyes include, without limitation, cyclobutenediylium 1,3-bis[3,8-dimethyl-5-(1-methylethyl)-1-azulenyl]-2,4-dihdyroxy bis(inner salt) (9CI) (guaiazulenyl dye) having the chemical structure shown in Formula IV as follows:

Formula IV

[Structure shown]

Croconium dyes have also shown suitable properties for use in conjunction with the present invention and have the general chemical structure shown in Formula V as follows:

Formula V

[Structure shown]

where R1, R2, R3, and R4 can independently be methyl, one or more nitrogen, sulfur, aryl or alkyl chains including chains having terminal hydroxyl or carboxyl substituents, aryl or substituted aryl such as napthyl, indolenyl and quilonyl groups, or R1-R2 and/or R3-R4 can form a cyclic member having five or six carbons.

Suitable polymethyl indolium compounds available from Aldrich Chemical Company that can be used include 2-[2-[2-chloro-3-[2-(1,3-dihydro-1,3,3-trimethyl-2H-indol-2-ylidene)-ethylidene]-1-cyclopenten-1-yl-ethenyl]-1,3,3-trimethyl-3H-indolium perchlorate; 2-[2-[2-Chloro-3-[2-(1,3-dihydro-1,3,3-trimethyl-2H-indol-2-ylidene)-ethylidene]-1-cyclopenten-1-yl-ethenyl]-1,3,3-trimethyl-3H-indolium chloride; 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propylindolium iodide; 2-[2-[2-chloro-3-[(1,3-dihydro-1,3,3-trimethyl-2H-indol-2-ylidene)ethylidene]-1-cyclohexen-1-yl]ethenyl]-1,3,3-trimethylindolium iodide; 2-[2-[2-chloro-3-[(1,3-dihydro-1,3,3-trimethyl-2H-indol-2-ylidene)ethylidene]-1-cyclohexen-1-yl]ethenyl]-1,3,3-trimethylindolium perchlorate; 2-[2-[3-[(1,3-dihydro-3,3-dimethyl-1-propyl-2H-indol-2-ylidene)ethylidene]-2-(phenylthio)-1-cyclohexen-1-yl]ethenyl]-3,3-dimethyl-1-propylindolium perchlorate; and mixtures thereof.

Other suitable absorbers can also be used within the present invention which are known to those skilled in the art and can be found in such references as Matsuoka, Masaru, ed., *Infrared Absorbing Dyes*, New York: Plenum Press, 1990 (ISBN 0-306-43478-4) and Daehne, Resch-Genger, Wolfbeis, *Near-Infrared Dyes for High Technology Applications,* Kluwer Academic Publishers (ISBN 0-7923-5101-0), both of which are incorporated herein by reference in their entireties. Although the specific activators and absorbers discussed herein are typically separate compounds, such activity can also be provided by constituent groups of a binder and/or leuco dye which incorporates the activation and/or radiation absorbing action with the leuco dye and is considered within the scope of the present invention.

The infrared absorber can be present in the color forming composition in an amount of from about 0.001 wt % to about 10 wt %, and typically, from about 0.5 wt % to about 1 wt %, although other weight ranges may be desirable depending on the activity of the particular absorber. These weight percentages represent an amount of infrared absorber that can be present when admixed with the leuco dye. These weight percentages can be altered in other embodiments, such as when the infrared absorber is applied in a separate layer of the color forming composition. Thus, it will be understood that although the color forming composition typically includes at least a leuco dye, infrared absorber, and at least one of a stabilizer and an anti-fade agent as a single phase mixture, the infrared absorber and/or stabilizer can alternatively be included in a separate layer from the leuco dye.

Stabilizers

In accordance with one aspect of the present invention, a stabilizer can be included in the color forming composition. The stabilizer can be configured for stabilizing the infrared absorber, thus maintaining the activity of the infrared absorber sufficient to cause development of the leuco dye up to the time of development. Typically, the stabilizer can be in optical proximity with the infrared absorber. The stabilizers of the present invention can also be used in the stabilization of leuco dyes. One factor to consider in selection of infrared absorbers is the solubility of the absorber in a particular color forming composition. Infrared absorbers having solubility properties such that there is intimate contact between the color-forming components can be used. Thus, the color forming compositions of the present invention can be a single phase admixture of leuco dyes, infrared absorber, and stabilizer or can include each of the aforementioned components in separate layers. Thus, the stabilizer can be admixed with the infrared absorber in an overcoating over the leuco dye or in a layer formed as an overcoat over the infrared absorber. The addition of appropriate stabilizers aids in preventing non-infrared radiation, e.g., sunlight, fluorescent light, or UV radiation during UV cure, from disabling the infrared absorber prior to development using an infrared radiation source. Further, stabilizers can aid in preventing undesirable changes in optical density of the color forming composition which may occur due to unintended development of the leuco dye either before or after development using an infrared radiation source.

Accordingly, suitable stabilizers can include chromans, thiolane-nickel complexes, spiroindanes, and mixtures thereof. In one embodiment, the stabilizer can be chroman having the chemical structure shown in Formula VI as follows:

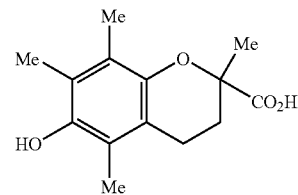

Formula VI

Other suitable stabilizers include thiolane-nickel complexes such as bis(4-dimethylaminodithiobenzil) nickel and the related class having the general structure shown in Formula VII as follows:

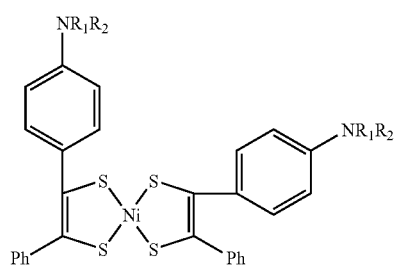

Formula VII where R1 and R2 can also be independently selected from methyl, substituted alkyl, aryl, heterocyclic aromatic groups with one nitrogen and one or more sulfur atoms in the ring, and tetrabutyl phosphonium (SP-4-1)-bis[4,5-di(mercapto-ηS)-1,3-dithiole-2-thionato(2-)]nickelate(1-) (9CI) having the chemical structure shown in Formula VIII as follows:

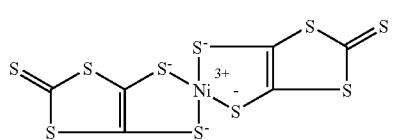

Formula VIII

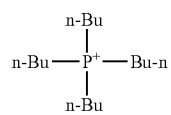

Further, spiroindane stabilizers can be advantageously used in the compositions and methods of the present invention. Specific examples of suitable spiroindane stabilizers include 1,1'-spirobi[1H-indene]-5,5',6,6'-tetrol-2,2',3,3'-tetrahydro-3,3,3',3'-tetramethyl-(9CI) having the chemical structure shown in Formula IX as follows:

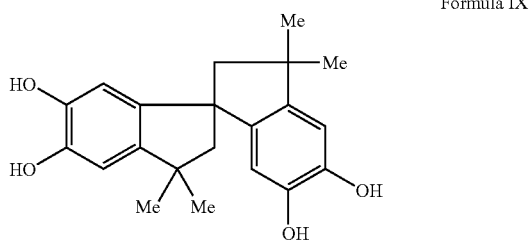

Formula IX or the corresponding isopropyl ether, 1,1'-spirobi[1H-indene]-2,2',3,3'-tetrhaydro-3,3,3',3'-tetramethyl-5,5',6,6'-tetrapropoxy-(9CI) having the chemical structure shown in Formula X as follows:

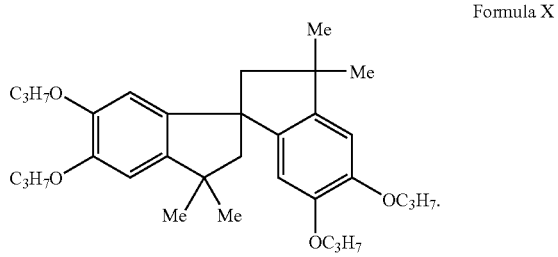

Formula X

Certain infrared absorber and stabilizer combinations have been found to be particularly effective. For example, nickel complexes can be used to effectively stabilize croconium dyes, while having a limited stabilizing effect on indocyanine dyes. Similarly, the chroman identified by Formula VI was found to be very effective with indocyanine dyes and croconium dyes. In one embodiment, the chroman and thiolane-nickel complexes can be used to stabilize infrared absorbers such as pyrimidinetrione-cyclopentylidenes and squarylium dyes such as guaiazulenyl dye. In another embodiment, thiolane-nickel complexes can be used to stabilize croconium infrared absorbers. In yet another embodiment, chroman can be used to stabilize polymethyl indolium infrared absorbers.

Typically, the stabilizers of the present invention can stabilize undeveloped portions of the color forming composition sufficient to retain activity of the infrared absorber over a period of at least 3 years. Additionally, the activity of the infrared absorber can be such that development of the color forming composition can occur in less than about 1 millisecond using a 50 mW infrared laser. One method of measuring the effectiveness of the particular stabilizer for use with specific infrared absorbers is to measure the optical density of a portion of the color forming composition applied on a substrate either before or after development using an infrared radiation source. The color forming composition can then be exposed to intense light, e.g., a 21K lux fluorescent light bank in a light chamber maintained at constant temperature, which simulates extended exposure to ambient light sources. The optical density can then be measured again and the change in optical density recorded. In accordance with the present invention, the stabilizers can effectively stabilize infrared absorbers over a period of at least three years such that no more than a 30% change in optical density is recorded. In most cases, the stabilizers of the present invention result in no more than about 25% degradation in optical density at 780 nm for infrared absorbers, or less than 0.1 OD units change in background optical density over a simulated three year period.

The proportion of stabilizer in the color-forming composition can vary from composition to composition, and generally corresponds to the amount of infrared absorber used. Thus, the stabilizer can be present in the color forming composition, whether formed as an admixture or in separate layers, from about 0.1 wt % to about 10 wt %, and can also range from about 0.1 wt % to about 5 wt %.

Anti-Fade Agents

As an additional component of the color forming compositions of the present invention, an anti-fade agent can be admixed with the leuco dye. Suitable anti-fade agents can be configured for inhibiting fading or oxidation of the leuco dye and/or other components of the color forming composition. Although other anti-fading agents can be used, an effective class of compounds found to reduce browning and help reduce fading is anti-oxidants. Without subscribing to any particular theory, oxidation of the leuco dye is thought to be at least one cause of undesirable browning of the color forming composition both before and after development of the leuco dye. The oxidation reactions can occur as the result of exposure to sunlight or UV radiation, such as that used in curing UV binders which are useful for applying the color forming compositions of the present invention. Additionally, the anti-fade agent has the beneficial affect of similarly protecting other components from browning, e.g., the binder, infrared absorber, etc. In one aspect of the present invention, the anti-fade agent can be chroman, vitamin E, vitamin E analogs such as vitamin E succinate and succinate esters of long chain alcohols, astaxanthin, ascorbic acid, carotene, and mixtures thereof. In another aspect, the anti-fade agent can be chroman, vitamin E, vitamin E analogs, astaxanthin, and mixtures thereof. Of some interest, is the use of chroman as the anti-fade agent. Specifically, chroman has proven useful as both an anti-fade agent and a stabilizer. Thus, if chroman is used as the anti-fade agent, other suitable stabilizers can be added to protect the infrared absorber. For example, if chroman is admixed with the leuco dye for use as an anti-fade agent, and an overcoat layer contains the infrared absorber, then the chroman would be limited, if not completely ineffective, in stabilizing the infrared absorber. In such a case, a separate stabilizer can be admixed with the infrared absorber or overcoated thereon. Alternatively, chroman can be admixed with a leuco dye and an infrared absorber in a single phase mixture such that the chroman acts as both a stabilizer and an anti-fade agent.

In accordance with the present invention, the anti-fade agent can reduce oxidation and browning effects such that developed and undeveloped portions of the color forming composition maintain substantially the same optical density over a time period of at least three years, unless specifically developed using infrared radiation as discussed in more detail below. Typically, a similar test of optical density can be used as described above in connection with the stabilizers to test the anti-browning properties of specific anti-fade agents in the color forming compositions of the present invention. The anti-fade agents of the present invention can prevent optical density changes greater than about 20% over a simulated three year period, and often reduce browning such that a change in optical density measures less than about 10%. The anti-fade agents of the present invention can be used with a number of leuco dyes as discussed above, however in one embodiment these anti-fade agents can be used with fluoran leuco dyes.

The proportion of the anti-fade agent can vary depending on the leuco dye and associated components. However, the anti-fade agent can typically be present in the color forming composition in from about 0.1wt % to about 10.0 wt % of the color forming composition, and can also range from about 1.0 wt % to about 5.0 wt %.

Other Optional Ingredients

The color forming compositions of the present invention can also include various additional components such as colorants, liquid vehicles, and other additives known to those skilled in the art. Depending on the specific leuco dye, the color forming composition can optionally include a reducing agent. Typical reducing agents include 1-phenyl-3-pyrozolidone (phenidone), hydrazine, formamide, formic acid, hexaarylbiimidazoles (HABI), ascorbic acid, phenols and substituted phenols, e.g., hydroquinone, and mixtures thereof.

In order to provide desirable color forming properties and spin-coatability, various factors such as viscosity and solids content can also be considered. The color forming compositions of the present invention can have less than about 10 wt % of solids, which typically provides good coating properties. For example, in one aspect, the solids content of a spin-coatable color forming composition can be from about 5 wt % to about 9 wt %.

The color forming composition can also include a binder. Various binders can influence the development properties of the color forming composition such as development speed, light stability, and wavelengths which can be used to develop the composition. Suitable binders can include, but are not limited to, polymeric materials such as polyacrylate from monomers and oligomers, polyvinyl alcohols, polyvinyl pyrrolidines, polyethylenes, polyphenols or polyphenolic esters, polyurethanes, acrylic polymers, and mixtures thereof. For example, the following binders can be used in the color forming composition of the present invention: cellulose acetate butyrate, ethyl acetate butyrate, polymethyl methacrylate, polyvinyl butyral, and mixtures thereof. Specific binders can be used for dissolving and/or dispersing the leuco dye, infrared absorber, and other components. Acceptable binder materials may also include, by way of example, UV curable polymers such as acrylate derivatives, oligomers, and monomers, such as included as part of a photo package. A photo package can include a light absorbing species that may be sensitized for curing using UV or electron beam curing systems. In choosing an appropriate binder, it is typically desirable to choose a binder which can be cured by radiation that does not also cause a color change in the leuco dye or otherwise decrease the stability of the color forming composition.

In certain embodiments of the present invention, it is sometimes desirable to add a plasticizer to improve coating flexibility, durability, and coating performance. Plasticizers can be either solid or liquid plasticizers. Such suitable plasticizers are well known to those skilled in the art, as exemplified in U.S. Pat. No. 3,658,543, which is incorporated herein by reference in its entirety. If the leuco dye and/or infrared absorber is applied in multiple layers, the plasticizer and binder can be included in any of the individual liquid carriers used to apply each layer.

Other additives can also be utilized for producing particular commercial products such as including a colorant to impart additional desired color to the image. The colorants can be leuco dyes which are developed at non-infrared wavelengths or non-leuco colorants which can provide a background color. In one embodiment, optional colorants can be standard pigments and/or dyes. For example, the use of an opacifier pigment or other colorant can be used to provide background color to the substrate. The optional colorants can be added to the color forming composition, underprinted, or overprinted, as long as the development of the leuco dye is not prevented from at least some development due to the presence of the optional colorant and does not significantly reduce the activity of the stabilizer and/or anti-fade agent. In another related embodiment, portions of the leuco dye can then be developed producing an image with a colored background. Examples of opacifiers include calcium carbonate, titanium dioxide, and the like. If a colored background is desired that will remain independent of leuco dye development, an opacifier pigment, other pigment, and/or dye can be admixed in the carrier to impart the desired color, or can be applied as a separate coating.

In one embodiment, the color forming composition can be prepared in solution which is substantially transparent or translucent. Any suitable liquid carrier, e.g., an alcohol with a surfactant, can be used which is compatible with a particular leuco dye and/or other components chosen for use. When the color forming composition is prepared in a solution form, it may be desirable to underprint a colored coating over at least a portion of the substrate beneath the color forming composition. The optional colored coating produces a background color that can be visible underneath the solution layer. This colored coating can contain various colorants such as other pigments and/or dyes. Alteratively, an optional colorant may be added to the data layer to produce the desired background color. If a background color is pre-printed, such coatings and compositions can be applied to the substrate using any of a variety of known techniques such as screen-printing, spin coating, sputtering, or spray coating. Each coating may be applied and then dried sequentially. In addition, such colored coatings may be applied over the color forming compositions of the present invention.

Further, various additional components, such as lubricants, surfactants, and materials imparting moisture resistance, can also be added to provide mechanical protection to the color forming composition. Other overcoat compositions can also be used and are well known to those skilled in the art.

Infrared Radiation Application for Development

In one embodiment of the present invention, the color forming composition can be applied to a substrate. The composition can be applied using any known technique such as spin-coating, screen printing, sputtering, spray coating, ink-jetting, or the like. A variety of substrates can be used such as optical disks, polymeric surfaces, glass, ceramics, or cellulose papers. In one embodiment, the color forming composition can be applied to an optical disk and select portions thereof developed using an infrared laser or other infrared radiation source. Typically, an image to be formed on the surface can be digitally stored and then rasterized or spiralized. The resulting data can be delivered to an infrared radiation source which exposes portions of the color forming composition to infrared radiation while the optical disk is spinning. The infrared radiation source can be a 780 nm laser such as those found in commercially available CD/DVD writeable and/or rewriteable systems.

The present invention relates generally to forming color images on a substrate using the color forming compositions of the present invention which can optionally be spin-coatable or printable. The compositions of the present invention can be prepared and applied in a variety of ways to a variety of substratres. For example, a color forming composition can be prepared that includes a liquid carrier, which can be substantially removed upon drying, that contains, without limitation, a leuco dye, an infrared absorber, and at least one of a stabilizer and an anti-fade agent. The color forming composition can include a liquid carrier, which can act to improve coating performance, but which can be removed upon coating through known liquid removal processes. Typically, at least a portion of the liquid carrier can be driven off or allowed to evaporate after the coating process is complete. The liquid carrier can include, but is not limited to, solvents such as methylethyl ketone, isopropyl alcohol or other alcohols and diols, water, surfactants, and mixtures thereof.

The color forming composition can cover the entire surface of a substrate or merely a portion thereof. In one embodiment, in order for the color forming composition to be developed as desired on the optical disk surface, an infrared absorber layer can be formed on at least approximately the same portions of the optical disk as a layer containing the leuco dye. This provides an optical disk having the infrared absorber layer in thermal contact with the leuco dye layer. If the two layers are not in actual contact, but are close enough in proximity for thermal activation of the leuco dye and/or activator to occur, the layers can also be said to be in thermal contact. Alternatively, as stated, the infrared absorber can be admixed with the leuco dye to form the color forming composition.

Once the color forming composition is applied to the substrate, the conditions under which the color forming compositions of the present invention are developed can be varied. For example, one can vary the infrared radiation wavelength, heat flux, and exposure time. The amount of heat which is to be applied depends partially on the activation energy of the development reaction of the leuco dye and the specific infrared absorber chosen. However, the heat applied is typically sufficient to develop the leuco dye without also decomposing the color forming composition or damaging the substrate. Such an energy level is typically well below the energy required for decomposition of the color forming composition. Variables such as spot size, focus, and laser power will also affect any particularly system design and can be chosen based on the desired results. With these variables fixed at predetermined values, the infrared radiation source can then direct infrared radiation to the color forming composition in accordance with the data received from a signal processor. Further, leuco dye and/or infrared radiation absorber concentration and proximity to one another can also be varied to affect the development times and the optical density of the image formed. Typically, the infrared absorber and the leuco dye are present in a common layer, and thus, concentration ratios can be considered for a desired affect. However, if the leuco dye and infrared absorber are placed in separate layers, proximity can be considered.

The color forming compositions of the present invention can be developed using lasers having from about 15 to 100 mW power usage, although lasers having a power outside this range can also be used. Typically, lasers having from about 30 mW to about 50 mW are readily commercially available and work well using the color forming composition described herein. The spot size can be determined by the infrared radiation that contacts the substrate at a single point in time. The spot size can be circular, oblong, or other geometric shape, and can range from about 1 to about 200 µm along a largest dimension, though smaller or larger sizes can also be used. In one embodiment, a radiation spot size of from about 10 µm to about 60 µm can be utilized.

Heat flux is a variable that can be altered as well, and can be from about 0.05 to 5.0 J/cm$^2$ in one embodiment, and from about 0.3 to 0.5 J/cm$^2$ in a second embodiment. The color forming compositions of the present invention can be optimized by adjusting the concentrations and type of infrared absorber, leuco dye, and stabilizer and/or anti-fade agent. Heat flux in these ranges allow for development of leuco dyes in optimized compositions in from about 10 µsec to about 100 µsec per dot in some embodiments. Further, the color forming compositions of the present invention can be optimized for development in less than about 1 millisecond, such as from about 100 µsec to about 500 µsec. Similarly, the color forming compositions can be optimized for development using infrared radiation having wavelengths of from about 760 nm to about 1250 nm, such as from about 760 nm to about 850 nm. In another embodiment, the color forming compositions can be optimized for development using infrared radiation having a wavelength of from about 750 nm to about 900 nm. In one embodiment, optimization for an infrared wavelength of about 780 nm can be done to utilize the present invention in commercially available lasers. Those skilled in the art can adjust these and other variables to achieve a variety of resolutions and developing times.

The following examples illustrate exemplary embodiments of the invention. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what is presently deemed to be practical embodiments of the invention.

EXAMPLES

Example 1

An amount of 2 grams of dibenzyl oxalate was heated to melting (~85° C.). Twenty grams of activator bisphenol-A and a specified amount of IR absorber and stabilizer were dissolved in the melted dibenzyl oxalate as indicated in Table 1 below. The activator/antenna solution was cooled and ground into a fine powder.

Five grams of the ground activator/antenna powder was dissolved in 15.3 g Nor-Cote CDG000 UV-lacquer (a mixture of UV curable acrylate monomers and oligomers) to form the lacquer/antenna/activator solution. To the lacquer/antenna/activator solution was added 14.5 g BK-400 leuco dye (2'-anilino-3'-methyl-6'-(dibutylamino)fluoran (available from Nagase), shown in Formula XI below:

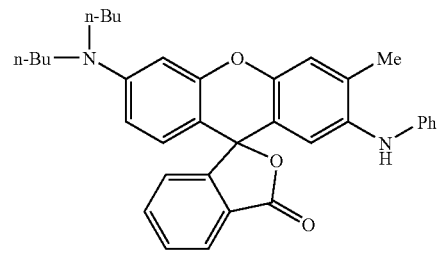

Formula XI

Prior to addition, the BK-400 lacquer dye was prepared by dissolving in 10% m-terphenyl at 170° C., cooling, and then grinding to a powder having particles sizes less than 5 micron), and then 1.9 g pure bisphenol-A (average particle size<5 µm) was added. The mixture was rendered to a fine paste and screen printed onto a substrate at a thickness of approximately 7 µm to form an imaging medium. The coating on the medium was then UV cured by a mercury lamp.

Direct marking was affected on the resulting coating substrate with a 45 mW laser. A mark of approximately 20 µm×45 µm was produced with energy applications of about 20 µsec to 100 µsec. Direct marking occurs when the desired image is marked on the imaging medium, without the use of a printing intermediary. The infrared absorbance was determined using a spectrophotometer set to measure absorbance at 780 nm, and is reported as a OD (optical density) in Table 1 below:

TABLE 1

| Infrared Absorber | Stabilizer | Initial OD | OD after Exposure | Change in OD | Acceptable |
|---|---|---|---|---|---|
| IR780 | None | 0.9 | 0 | 0.9 | No |
| IR780 | Chroman 1% (Formula VI) | 4.5 | 0.6 | 3.9 | UV cure - Yes Light fade - No |
| IR780 | Nickel complex (Formula XIII) | 0.9 | 0 | 0.9 | No |
| Sensient ST9/1 (croconium) | None | 0.15 | 0 | 0.15 | No |
| Sensient ST9/1 (croconium) | Nickel complex 0.1% (Formula XIII) | 0.85 | 0.85 | 0 | Yes |
| Sensient ST9/1 (croconium) | Chroman 1% (Formula VI) | 0.85 | 0.85 | 0 | Yes |
| S0322 (Formula I) | ST1207 (Formula VII) | 0.75 | 0.75 | 0 | Yes |
| S0322 (Formula I) | Chroman 1% (Formula VI) | 0.75 | 0.75 | 0 | Yes |

Example 2

The same procedure as in Example 1 was followed except that 20 g of active bipshenol-A and a specified amount of IR absorber and anti-fading agent were dissolved in the melted dibenzyl oxalate as indicated in Table 2 below:

TABLE 2

| Infrared Absorber | Anti-fading agent | Initial OD | OD after Exposure | Change in OD | Acceptable |
|---|---|---|---|---|---|
| IR780 (0.2%) | None | 0.2 | 0.4 | 0.2 | No |
| IR780 (0.2%) | Chroman 1% (Formula VI) | 0.2 | 0.2 | 0 | Yes |
| IR780 (0.2%) | Astaxanthine (9% solution in fish oil) | 0.2 | 0.2 | 0 | Yes |

It is to be understood that the above-referenced arrangements are illustrative of the application for the principles of the present invention. Numerous modifications and alternative arrangements can be devised without departing from the spirit and scope of the present invention while the present invention has been discussed above in connection with the exemplary embodiment(s) of the invention. It will be apparent to those of ordinary skill in the art that numerous modifications can be made without departing from the principles and concepts of the invention as set forth in the claims.

What is claimed is:

1. A color forming composition, comprising:
   a) a leuco dye;
   b) an infrared absorber admixed with or in thermal contact with the leuco dye; and
   c) a stabilizer selected from the group consisting of thiolane-nickel complex, spiroindane, and mixtures thereof, wherein said stabilizer is admixed with the infrared absorber.

2. The composition of claim 1, wherein the stabilizer is selected from the group consisting of bis(4-dimethylaminodithiobenzil)nickel; tetrabutyl-phosphonium (SP-4-1)-bis[4,5-di(mercapto-ηS)-1,3-dithiole-2-thionato(2)]nickelate (1-) (9CI); 1,1'-spirobi[1H-indene]-5,5',6,6'-tetrol-2,2',3,3'-tetrahydro-3,3,3',3'-tetramethyl-(9CI); 1,1'-spirobi[1H-indene]-2,2',3,3'-tetrahydro-3,3,3',3'-tetramethyl-5,5',6,6'-tetrapropoxy-(9CI); and mixtures thereof.

3. The composition of claim 1, wherein the infrared absorber is selected from the group consisting of pyrimidinetrione-cyclopentylidenes, guaizonyl dyes, croconium dyes, and mixtures thereof.

4. The composition of claim 3, wherein the infrared absorber is selected from the group consisting of pyrimidinetrione-cyclopentylidene and guaizonyl dye and the stabilizer is a nickel dithiolane complex.

5. The composition of claim 4, wherein the infrared absorber is selected from the group consisting of 2,4,6(1H, 3H,5H)-pyrimidenetrione 5-[2,5-bis[(1-ethyl-1,3-dihydro-3, 3-dimethyl-2H-indol-2-ylidene)ethylidene]cyclopentyl-idene]-(9CI); 2,4,6(1H,3H,5H)-pyrimidinetrione 5-[2,5-bis [(1,3-dihdyro-1,1,3-trimethyl-2H-benz[e]indol-2-ylidene) ethylidene]cyclopentylidene]-1,3-dimethyl-(9CI); methanaminium N-[5-[3-[5-(dimethylamino)-2-thienyl]-2-hydroxy-4,5-dioxo-2-cyclopenten-1-ylidene]-2(5H)-thienylidene]-N-methyl-inner salt (9CI); cyclobutenediylium 1,3-bis[3,8-dimethyl-5-(1-methylethyl)-1-azulenyl]-2,4-dihydroxy-bis(inner salt) (9CI); and mixtures thereof.

6. The composition of claim 1, wherein the color forming composition is optimized for development using infrared radiation having a wavelength of from about 750 nm to about 900 nm.

7. The composition of claim 1, wherein the leuco dye is selected from the group consisting of fluorans, phthalides, amino-triarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids and corresponding esters, 2(p-hydroxyphenyl)-4,5-diphenylimidazoles, indanones, leuco indamines, hydrozines, leuco indigoid dyes, amino-2,3-dihydroanthraquinones, tetrahydro-p,p'-biphenols, 2(p-hydroxyphenyl)-4,5-diphenylimidazoles, phenethylanilines, and mixtures thereof.

8. The composition of claim 1, further comprising an anti-oxidant selected from the group consisting of chroman, vitamin E, vitamin E analogs, astaxanthin, ascorbic acid, carotene, and mixtures thereof.

9. A color forming composition, comprising:
   a) a leuco dye;
   b) an infrared absorber admixed with or in thermal contact with the leuco dye; and
   c) an anti-fade agent selected from the group consisting of chroman, vitamin E, vitamin E analogs, astaxanthin, ascorbic acid, carotene, and mixtures thereof, wherein said anti-fade agent is admixed with the leuco dye.

10. The composition of claim 9, wherein the anti-fade agent is selected from the group consisting of chroman, vitamin E, vitamin E analogs, astaxanthin, and mixtures thereof.

11. The composition of claim 10, wherein the anti-fade agent is chroman.

12. The composition of claim 10, wherein said leuco dye is a fluoran.

13. The composition of claim 9, wherein the leuco dye is selected from the group consisting of fluorans, phthalides, amino-triarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids and corresponding esters, 2(p-hydroxyphenyl)-4,5-diphenylimidazoles, indanones, leuco indamines, hydrozines, leuco indigoid dyes, amino-2,3-dihydroanthraquinones, tetrahalop,p'-biphenols, 2-(p-hydroxyphenyl)-4,5-diphenylimidazoles, phenethylanilines, and mixtures thereof.

14. The composition of claim 9, wherein the infrared absorber is selected from the group consisting of pyrimidinetrione-cyclopentylidenes, guaizonyl dyes, croconium dyes, and mixtures thereof.

15. The composition of claim 9, wherein the color forming composition is spin-coatable.

16. A color forming composition, comprising:
  a) a leuco dye;
  b) an infrared absorber admixed with or in thermal contact with the leuco dye; and
  c) a chroma stabilizer admixed with the infrared absorber, said chroman stabilizer configured for both stabilizing the infrared absorber and inhibiting oxidation of the leuco dye.

17. The composition of claim 16, wherein the infrared absorber is selected from the group consisting of pyrimidinetrione-cyclopentylidenes, guaizonyl dyes, croconium dyes, and mixtures thereof.

18. The composition of claim 17, wherein the infrared absorber is selected from the group consisting of pyrimidinetrione-cyclopentylidene and guaizonyl dye.

19. The composition of claim 18, wherein the infrared absorber is selected from the group consisting of 2,4,6(1H, 3H,5H)-pyrimidenetrione 5-[2,5-bis[(1-ethyl-1,3-dihydro-3, 3-dimethyl-2H-indol-2-ylidene)ethylidene]cyclopentylidene]-(9CI); 2,4,6(1H,3H,5H)-pyrimidinetrione 5-[2,5-bis [(1,3-dihdyro-1,1,3-trimethyl-2H-benz[e]indol-2-ylidene) ethylidene]cyclopentylidene]-1,3-dimethyl-(9CI); methanaminium N-[5-[3-[5-(dimethylamino)-2-thienyl]-2-hydroxy-4,5-dioxo-2-cyclopenten-1-ylidene]-2(5H)-thienylidene]-N-methyl-inner salt (9CI); cyclobutenediylium 1,3-bis[3,8-dimethyl-5-(1-methylethyl)-1-azulenyl]-2,4-dihydroxy-bis(inner salt) (9CI); and mixtures thereof.

20. The composition of claim 16, wherein the color forming composition is optimized for development using infrared radiation having a wavelength of from about 750 nm to about 900 nm.

21. The composition of claim 16, wherein the leuco dye is selected from the group consisting of fluorans, phthalides, amino-triarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids and corresponding esters, 2(p-hydroxyphenyl)-4,5-diphenylimidazoles, indanones, leuco indamines, hydrozines, leuco indigoid dyes, amino-2,3-dihydroanthraquinones, tetrahydro-p,p'-biphenols, 2(p-hydroxyphenyl)-4,5-diphenylimidazoles, phenethylanilines, and mixtures thereof.

22. The composition of claim 16, further comprising an anti-oxidant selected from the group consisting of vitamin E, vitamin E analogs, astaxanthin, ascorbic acid, carotene, and mixtures thereof.

23. A color forming composition, comprising:
  a) a leuco dye;
  b) an infrared absorber admixed with or in thermal contact with the leuco dye;
  c) a chroman stabilizer admixed with the infrared absorber, said chroman stabilizer formulated for stabilizing the infrared absorber; and
  d) an anti-oxidant, other than the chroman stabilizer, formulated for inhibiting oxidation of the leuco dye.

24. The composition of claim 23, wherein the infrared absorber is selected from the group consisting of pyrimidinetrione-cyclopentylidenes, guaizonyl dyes, croconium dyes, and mixtures thereof.

25. The composition of claim 24, wherein the infrared absorber is selected from the group consisting of pyrimidinetrione-cyclopentylidene and guaizonyl dye and the stabilizer is a nickel dithiolane complex.

26. The composition of claim 25, wherein the infrared absorber is selected from the group consisting of 2,4,6(1H, 3H,5H)-pyrimidenetrione 5-[2,5-bis[(1-ethyl-1,3-dihydro-3, 3-dimethyl-2H-indol-2-ylidene)ethylidene]cyclopentylidene]-(9CI); 2,4,6(1H,3H,5H)-pyrimidinetrione 5-[2,5-bis [(1,3-dihdyro-1,1,3-trimethyl-2H-benz[e]indol-2-ylidene) ethylidene]cyclopentylidene]-1,3-dimethyl-(9CI); methanaminium N-[5-[3-[5-(dimethylamino)-2-thienyl]-2-hydroxy-4,5-dioxo-2-cyclopenten-1-ylidene]-2(5H)-thienylidene]-N-methyl-inner salt (9CI); cyclobutenediylium 1,3-bis[3,8-dimethyl-5-(1-methylethyl)-1-azulenyl]-2,4-dihydroxy-bis(inner salt) (9CI); and mixtures thereof.

27. The composition of claim 23, wherein the color forming composition is optimized for development using infrared radiation having a wavelength of from about 750 nm to about 900 nm.

28. The composition of claim 23, wherein the leuco dye is selected from the group consisting of fluorans, phthalides, aminotriarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids and corresponding esters, 2(p-hydroxyphenyl)-4,5-diphenylimidazoles, indanones, leuco indamines, hydrozines, leuco indigoid dyes, amino-2,3-dihydroanthraquinones, tetrahydro-p,p'-biphenols, 2(p-hydroxyphenyl)-4,5-diphenylimidazoles, phenethylanilines, and mixtures thereof.

29. The composition of claim 23, wherein the anti-oxidant is selected from the group consisting of vitamin E, vitamin E analogs, astaxanthin, ascorbic acid, carotene, and mixtures thereof.

30. A color forming article, comprising:
  a) a leuco dye;
  b) an infrared absorber admixed with or in thermal contact with the leuco dye; and
  c) a stabilizer selected from the group consisting of thiolane-nickel complex, spiroindane, and mixtures thereof, wherein said stabilizer is overprinted with respect to the infrared absorber.

31. The article of claim 30, wherein the stabilizer is selected from the group consisting of bis(4-dimethylaminodithiobenzil)nickel; tetrabutyl-phosphonium (SP-4-1)-bis [4,5-di(mercapto-ηS)-1,3-dithiole-2-thionato(2)]nickelate (1-) (9CI); 1,1'-spirobi[1H-indene]-5,5',6,6'-tetrol-2,2',3,3'-tetrahydro-3,3,3',3'-tetramethyl-(9CI); 1,1'-spirobi[1H-indene]-2,2',3,3',3'-tetrahydro-3,3,3',3'-tetramethyl-5,5',6,6'-tetrapropoxy-(9CI); and mixtures thereof.

32. The article of claim 30, wherein the infrared absorber is selected from the group consisting of pyrimidinetrione-cyclopentylidenes, guaizonyl dyes, croconium dyes, and mixtures thereof.

33. The article of claim 32, wherein the infrared absorber is selected from the group consisting of pyrimidinetrione-cyclopentylidene and guaizonyl dye and the stabilizer is a nickel dithiolane complex.

34. The article of claim 33, wherein the infrared absorber is selected from the group consisting of 2,4,6(1H,3H,5H)-pyrimidenetrione 5-[2,5-bis[(1-ethyl-1,3-dihydro-3,3-dimethyl-2H-indol-2-ylidene)ethylidene]cyclopentylidene]-(9CI); 2,4,6(1H,3H,5H)-pyrimidinetrione 5-[2,5-bis[(1,3-dihdyro-1,1,3-trimethyl-2H-benz[e]indol-2-ylidene) ethylidene]cyclopentylidene]-1,3-dimethyl-(9CI); methanaminium N-[5-[3-[5-(dimethylamino)-2-thienyl]-2-hydroxy-4,5-dioxo-2-cyclopenten-1-ylidene]-2(5H)-thienylidene]-N-methyl-inner salt (9CI); cyclobutenediylium 1,3-bis[3,8-dimethyl-5-(1-methylethyl)-1-azulenyl]-2,4-dihydroxy-bis(inner salt) (9CI); and mixtures thereof.

35. The article of claim 30, wherein the color forming article is optimized for development using infrared radiation having a wavelength of from about 750 nm to about 900 nm.

36. The article of claim 30, wherein the leuco dye is selected from the group consisting of fluorans, phthalides, amino-triarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids and corresponding esters, 2(p-hydroxyphenyl)-4,5-diphenylimidazoles, indanones, leuco indamines, hydrozines, leuco indigoid dyes, amino-2,3-dihydroanthraquinones, tetrahydro-p,p'-biphenols, 2(p-hydroxyphenyl)-4,5-diphenylimidazoles, phenethylanilines, and mixtures thereof.

37. The article of claim 30, further comprising an anti-oxidant selected from the group consisting of chroman, vitamin E, vitamin E analogs, astaxanthin, ascorbic acid, carotene, and mixtures thereof.

38. A color forming article, comprising:
a) a leuco dye;
b) an infrared absorber admixed with or in thermal contact with the leuco dye; and
c) a chroman stabilizer overprinted with respect to the infrared absorber, said chroman stabilizer configured for both stabilizing the infrared absorber and inhibiting oxidation of the leuco dye.

39. The article of claim 38, wherein the infrared absorber is selected from the group consisting of pyrimidinetrione-cyclopentylidenes, guaizonyl dyes, containing dyes, and mixtures thereof.

40. The article of claim 39, wherein the infrared absorber is selected from the group consisting of pyrimidinetrione-cyclopentylidene and guaizonyl dye.

41. The article of claim 40, wherein the infrared absorber is selected from the group consisting of 2,4,6(1H,3H,5H)-pyrimidenetrione 5-[2,5-bis[(1-ethyl-1,3-dihydro-3,3-dimethyl-2H-indol-2-ylidene)ethylidene]cyclopentylidene]-(9CI); 2,4,6(1H,3H,5H)-pyrimidinetrione 5-[2,5-bis[(1,3-dihdyro-1,1,3-trimethyl-2H-benz[e]indol-2-ylidene) ethylidene]cyclopentylidene]-1,3-dimethyl-(9CI); methanaminium N-[5-[3-[5-(dimethylamino)-2-thienyl]-2-hydroxy-4,5-dioxo-2-cyclopenten-1-ylidene]-2(5H)-thienylidene]-N-methyl-inner salt (9CI); cyclobutenediylium 1,3-bis[3,8-dimethyl-5-(1-methylethyl)-1-azulenyl]-2,4-dihydroxy-bis(inner salt) (9CI); and mixtures thereof.

42. The article of claim 38, wherein the color forming composition is optimized for development using infrared radiation having a wavelength of from about 750 nm to about 900 nm.

43. The article of claim 38, wherein the leuco dye is selected from the group consisting of fluorans, phthalides, amino-triarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids and corresponding esters, 2(p-hydroxyphenyl)-4,5-diphenylimidazoles, indanones, leuco indamines, hydrozines, leuco indigoid dyes, amino-2,3-dihydroanthraquinones, tetrahydro-p,p'-biphenols, 2(p-hydroxyphenyl)-4,5-diphenylimidazoles, phenethylanilines, and mixtures thereof.

44. The article of claim 38, further comprising an anti-oxidant selected from the group consisting of vitamin E, vitamin E analogs, astaxanthin, ascorbic acid, carotene, and mixtures thereof.

45. A color forming article, comprising:
a) a leuco dye;
b) an infrared absorber admixed with or in thermal contact with the leuco dye;
c) a chroman stabilizer overprinted with respect to the infrared absorber, said chroman stabilizer formulated for stabilizing the infrared absorber; and
d) an anti-oxidant, other than the chroman stabilizer, formulated for inhibiting oxidation of the leuco dye.

46. The article of claim 45, wherein the infrared absorber is selected from the group consisting of pyrimidinetrione-cyclopentylidenes, guaizonyl dyes, croconium dyes, and mixtures thereof.

47. The article of claim 46, wherein the infrared absorber is selected from the group consisting of pyrimidinetrione-cyclopentylidene and guaizonyl dye and the stabilizer is a nickel dithiolane complex.

48. The article of claim 47, wherein the infrared absorber is selected from the group consisting of 2,4,6(1H,3H,5H)-pyrimidenetrione 5-[2,5-bis[(1-ethyl-1,3-dihydro-3,3-dimethyl-2H-indol-2-ylidene)ethylidene]cyclopentylidene]-(9CI); 2,4,6(1H,3H,5H)-pyrimidinetrione 5-[2,5-bis[(1,3-dihdyro-1,1,3-trimethyl-2H-benz[e]indol-2-ylidene) ethylidene]cyclopentylidene]-1,3-dimethyl-(9CI); methanaminium N-[5-[3-[5-(dimethylamino)-2-thienyl]-2-hydroxy-4,5-dioxo-2-cyclopenten-1-ylidene]-2(5H)-thienylidene]-N-methyl-inner salt (9CI); cyclobutenediylium 1,3-bis[3,8-dimethyl-5-(1-methylethyl)-1-azulenyl]-2,4-dihydroxy-bis(inner salt) (9CI); and mixtures thereof.

49. The article of claim 45, wherein the color forming article is optimized for development using infrared radiation having a wavelength of from about 750 nm to about 900 nm.

50. The article of claim 45, wherein the leuco dye is selected from the group consisting of fluorans, phthalides, amino-triarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids and corresponding esters, 2(p-hydroxyphenyl)-4,5-diphenylimidazoles, indanones, leuco indamines, hydrozines, leuco indigoid dyes, amino-2,3-dihydroanthraquinones, tetrahydro-p,p'-biphenols, 2(p-hydroxyphenyl)-4,5-diphenylimidazoles, phenethylanilines, and mixtures thereof.

51. The article of claim 45, further comprising the anti-oxidant is selected from the group consisting of vitamin E, vitamin E analogs, astaxanthin, ascorbic acid, carotene, and mixtures thereof.

* * * * *

UNITED STATES PATENT AND TRADEMARK OFFICE
CERTIFICATE OF CORRECTION

PATENT NO.         : 7,329,630 B2
APPLICATION NO.    : 10/655684
DATED              : February 12, 2008
INVENTOR(S)        : Makarand P. Gore It is certified that error appears in the above-identified patent and that said Letters Patent is hereby corrected as shown below:

In column 1, line 39, delete "peripheral" and insert -- preprinted --, therefor.

In column 1, line 50, after "period of" insert -- even --.

In column 3, line 2, delete "though" and insert -- through --, therefor.

In column 3, line 17, delete "radio" and insert -- ratio --, therefor.

In column 3, line 32, delete "such has" and insert -- such as --, therefor.

In column 7, line 61, delete "naphthyl" and insert -- napthyl --, therefor.

In column 7, line 65, delete "dihdyroxy" and insert -- dihydroxy --, therefor.

In column 9, line 9, delete "with" and insert -- within --, therefor.

In column 10, line 44, delete "ηS" and insert -- κS --, therefor.

In column 16, line 55, delete "lacquer" and insert -- leuco --, therefor.

In column 17, line 35, delete "active bipshenol-A" and insert -- activator bisphenol-A --, therefor.

In column 17, line 55, delete "discussed" and insert -- described --, therefor.

In column 18, line 8, in Claim 2, delete "(mercapto-ηS)" and insert -- (mercapto-κS) --, therefor.

In column 18, line 23, in Claim 5, delete "pyrimidenetrione" and insert -- pyrimidinetrione --, therefor.

In column 18, line 26, in Claim 5, delete "[(1,3-dihdyro-1," and insert -- [(l,3-dihydro-1, --, therefor.

In column 18, lines 45-46, in Claim 7, delete "tetrahydro-p" and insert -- tetrahalo-p --, therefor.

In column 19, line 10, in Claim 13, delete "2-(p-hydroxyphenyl)" and insert -- 2(p-hydroxyphenyl) --, therefor.

In column 19, line 14, in Claim 14, delete "guaizonyl" and insert -- guaiazulenyl --, therefor.

UNITED STATES PATENT AND TRADEMARK OFFICE
CERTIFICATE OF CORRECTION

PATENT NO. : 7,329,630 B2
APPLICATION NO. : 10/655684
DATED : February 12, 2008
INVENTOR(S) : Makarand P. Gore It is certified that error appears in the above-identified patent and that said Letters Patent is hereby corrected as shown below:

In column 19, line 22, in Claim 16, delete "chroma" and insert -- chroman --, therefor.

In column 19, line 38, in Claim 19, delete "[(l,3-dihdyro-1," and insert -- [(1,3-dihydro-1, --, therefor.

In column 19, lines 57-58, in Claim 21, delete "tetrahydro-p" and insert -- tetrahalo-p --, therefor.

In column 20, line 20, in Claim 26, delete "[(l,3-dihdyro-1," and insert -- [(1,3-dihydro-1, --, therefor.

In column 20, lines 40-41, in Claim 28, delete "tetrahydro-p" and insert -- tetrahalo-p --, therefor.

In column 20, line 59, in Claim 31, delete "(mercapto-$\eta$S)" and insert -- (mercapto-$\kappa$S) --, therefor.

In column 21, line 10, in Claim 34, delete "dihdyro-1," and insert -- dihydro-1, --, therefor.

In column 21, lines 28-29, in Claim 36, delete "tetrahydro-p" and insert -- tetrahalo-p --, therefor.

In column 21, line 45, in Claim 39, delete "containing dyes" and insert -- croconium dyes --, therefor.

In column 21, line 55, in Claim 41, delete "dihdyro-1," and insert -- dihydro-1, --, therefor.

In column 21, line 63, in Claim 42, delete "composition" and insert -- article --, therefor.

In column 22, lines 9-10, in Claim 43, delete "tetrahydro-p" and insert -- tetrahalo-p --, therefor.

In column 22, line 39, in Claim 48, delete "dihdyro-1," and insert -- dihydro-1, --, therefor.

UNITED STATES PATENT AND TRADEMARK OFFICE
CERTIFICATE OF CORRECTION

PATENT NO. : 7,329,630 B2
APPLICATION NO. : 10/655684
DATED : February 12, 2008
INVENTOR(S) : Makarand P. Gore It is certified that error appears in the above-identified patent and that said Letters Patent is hereby corrected as shown below:

In column 22, lines 57-58, in Claim 50, delete "tetrahydro-p" and insert -- tetrahalo-p --, therefor.

In column 22, line 60, in Claim 51, delete "further comprising" and insert -- wherein --, therefor.

Signed and Sealed this

Twelfth Day of August, 2008

JON W. DUDAS
*Director of the United States Patent and Trademark Office*